US011047341B2

(12) United States Patent
Loetz

(10) Patent No.: US 11,047,341 B2
(45) Date of Patent: Jun. 29, 2021

(54) PRECHAMBER FLUID INJECTION

(71) Applicant: Caterpillar Inc., Deerfield, IL (US)

(72) Inventor: Andrew J. Loetz, West Lafayette, IN (US)

(73) Assignee: Caterpillar Inc., Peoria, IL (US)

(*) Notice: Subject to any disclaimer, the term of this patent is extended or adjusted under 35 U.S.C. 154(b) by 297 days.

(21) Appl. No.: 16/188,996

(22) Filed: Nov. 13, 2018

(65) Prior Publication Data

US 2020/0149498 A1    May 14, 2020

(51) Int. Cl.
| | |
|---|---|
| *F02M 25/03* | (2006.01) |
| *F02M 25/022* | (2006.01) |
| *F02B 19/12* | (2006.01) |
| *F02B 47/02* | (2006.01) |

(52) U.S. Cl.
CPC .............. *F02M 25/03* (2013.01); *F02B 19/12* (2013.01); *F02B 47/02* (2013.01); *F02M 25/0227* (2013.01)

(58) Field of Classification Search
CPC .... F02M 21/02; F02M 25/03; F02M 25/0227; F02B 19/00; F02B 19/12; F02B 19/108; F02B 19/10; F02B 19/1019; F02B 19/1023; F02B 47/02; F02B 43/00; F02B 2043/103; F02D 35/023; F02D 41/0025; F02D 19/12; F02D 19/02
See application file for complete search history.

(56) References Cited

U.S. PATENT DOCUMENTS

| | | | | |
|---|---|---|---|---|
| 5,012,772 A | * | 5/1991 | Nakamura | ............... F02B 47/00 123/25 C |
| 6,073,605 A | * | 6/2000 | Matsuoka | ............... F02B 19/02 123/292 |
| 6,415,745 B1 | | 7/2002 | Hellen et al. | |
| 7,739,985 B2 | | 6/2010 | Keays | |
| 8,857,405 B2 | * | 10/2014 | Attard | ..................... F02B 19/10 123/261 |
| 9,353,674 B2 | * | 5/2016 | Bunce | ..................... F02B 19/12 |
| 9,644,527 B2 | | 5/2017 | Schaumberger et al. | |
| 10,077,730 B2 | * | 9/2018 | Jayaram | ................ F02D 35/023 |

(Continued)

FOREIGN PATENT DOCUMENTS

| | | |
|---|---|---|
| EP | 2631448 | 8/2013 |
| JP | H06229318 | 8/1994 |

(Continued)

OTHER PUBLICATIONS

Machine translation, Detailed Description JPH06229318A, Matsuoka, published Aug. 16, 1994, obtained from https://worldwide.espacenet.com/, pp. 1-3 (Year: 1994).*

*Primary Examiner* — Grant Moubry
(74) *Attorney, Agent, or Firm* — Schwegman, Lundberg & Woessner

(57) ABSTRACT

A system and method for combustion in an engine includes a combustion chamber, a prechamber, and a fluid injector. The prechamber extends from a first end to a second is fluidly connected to the combustion chamber through at least one port positioned at the first end of the prechamber. The fluid injector is configured to introduce a fluid into the prechamber following combustion of an air-fuel mixture within the prechamber and positioned to introduce the fluid into the prechamber at the second end of the prechamber.

18 Claims, 3 Drawing Sheets

(56) References Cited

U.S. PATENT DOCUMENTS

| | | | | |
|---|---|---|---|---|
| 10,287,969 | B2* | 5/2019 | Boyde | F02M 21/0275 |
| 2011/0108000 | A1* | 5/2011 | Williams | F02M 25/03 |
| | | | | 123/25 C |
| 2016/0245151 | A1* | 8/2016 | Yuuki | F02B 19/08 |

FOREIGN PATENT DOCUMENTS

| | | |
|---|---|---|
| JP | H07127453 | 5/1995 |
| JP | 2001164955 | 6/2001 |
| JP | 2004251194 | 9/2004 |
| NL | 4616 C | 1/1919 |
| WO | 2012025662 | 3/2012 |

\* cited by examiner

PRECHAMBER FLUID INJECTION

TECHNICAL FIELD

The present application relates generally to internal combustion engines. More particularly, the present application relates to fluid injection for prechambers of gas engines.

BACKGROUND

Internal combustion engines can include several combustion cylinders Where an air-fuel mixture is ignited to generate power that is converted into mechanical power through driving of a piston. During combustion of the air-fuel mixture, nitrogen oxide (NOx) gases are produced within the engine due in part to the high temperatures within the combustion chamber. During operation of the internal combustion engine, it is desirable to limit the amount of produced NOx.

SUMMARY OF THE INVENTION

In one example, a combustion system includes a combustion chamber, a prechamber, and a fluid injector. The prechamber extends from a first end to a second end and is fluidly connected to the combustion chamber through at least one port positioned at the first end of the prechamber. The fluid injector is configured to introduce a fluid into the prechamber following combustion of an air-fuel mixture within the prechamber and positioned to introduce the fluid into the prechamber at the second end of the prechamber.

In another example, a method of operating an engine includes providing an air-fuel mixture into a prechamber of the engine. The prechamber extends from a first end to a second end. The method also includes igniting the air-fuel mixture within the prechamber, transferring the ignited air-fuel mixture to a main chamber through at least one port located at the first end of the prechamber, and delivering, by a fluid injector positioned at the second end of the prechamber, a fluid into the prechamber following combustion of the air-fuel mixture in the prechamber. The main chamber is in fluid communication with the prechamber through the at least one port.

In another example, an engine includes a cylinder, a cylinder head, a prechamber, a fluid injector, and a fluid reservoir. The cylinder includes piston disposed therein defining a main chamber. The prechamber is disposed within the cylinder head, extends from a first end to a second end, and is fluidly connected to the main chamber through at least one port positioned in the first end. The fluid injector is positioned at the second end of the prechamber and is configured to deliver a fluid into the prechamber, and the fluid reservoir is configured to hold the fluid for the fluid injector.

DETAILED DESCRIPTION

A prechamber for a combustion engine is disclosed herein that includes a fluid injector positioned and configured to deliver a fluid into the prechamber following combustion therein. Prechamber combustion produces nitrogen oxide (NOx), which can contribute to the overall NOx production of the engine. The fluid injector is positioned at an end of the prechamber opposite the main combustion chamber and configured to inject fluid, such as water, into the prechamber following combustion of an air-fuel mixture therein. By injecting the fluid, the temperature within the prechamber can be reduced, thereby reducing NOx formation within the prechamber, which, in turn, reduces the overall production of NOx by the engine.

Figure 1:
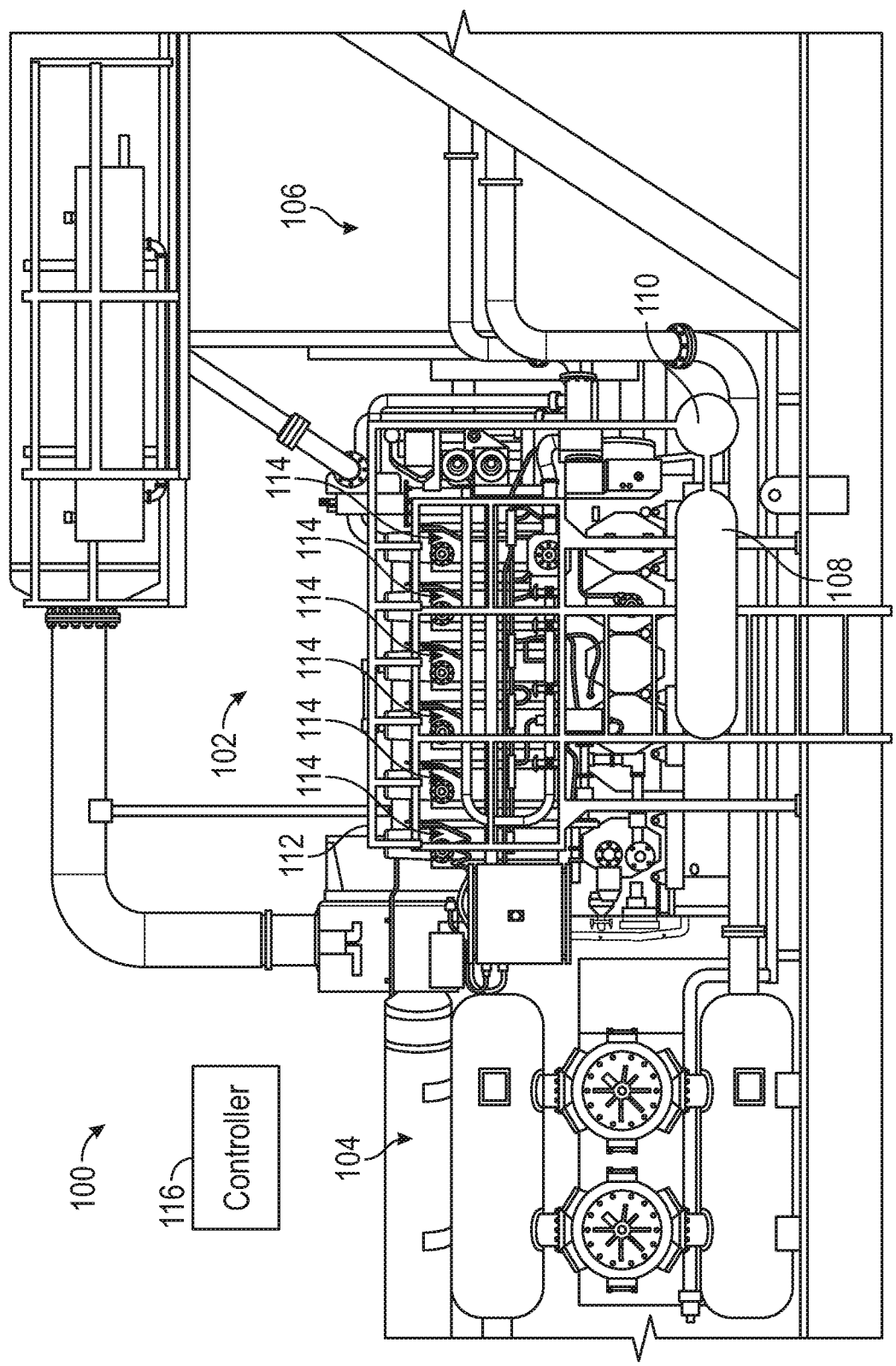
FIG. 1 is a perspective view of an example system including a gas engine.

FIG. 1 is a perspective view of an example gas compression system 100 that includes a gas engine 102, compressors 104, and radiators 106. The system 100 can be used for gas compression applications such as gas lift, gas gathering, wellhead gas compression, pipeline compression, storage, gathering, and re-injection. In one example, the system 100 can be a natural gas extraction system in which the gas engine 102 drives the compressors 104 to extract natural gas, and the one or more radiators 106 are used by both the compressors 104 and the engine 102 for cooling. While illustrated and described with reference to a gas compression system 100, the fluid injection system and methods described herein can be used in any internal combustion engine that includes combustion in a prechamber, or, in other words, pre-combustion.

In the embodiment illustrated in FIG. 1, the engine 102 includes a fluid reservoir 108, a fluid pump 110, and supply lines 112. The engine 102 includes several cylinders 114 that each receive the fluid from the supply lines 112. A controller 116 is configured to control at least some aspects of operation of the engine 102. The controller 116 can be located anywhere with respect to the engine 102 and can include any number of digital or analog circuits configured to monitor and control the engine 102 through any wired or wireless connections. The controller 116 can be connected to provide, among other things, control of the fluid delivery from the fluid reservoir 108 to the cylinders 114.

The controller 116 can include, for example, software, hardware, and combinations of hardware and software configured to execute several functions related to control of the engine 102. Controller 116 can be an analog, digital, or combination analog and digital controller including a number of components. As examples, the controller 116 can include integrated circuit boards or ICB(s), printed circuit boards PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), or equivalent discrete or integrated logic circuitry.

The controller 116 may include storage media to store and/or retrieve data or other information such as, for example, signals from sensors placed about the engine 102. Storage devices, in some examples, are described as a computer-readable storage medium. The data storage devices can be used to store program instructions for execution by processor(s) of controller 116, for example. The storage devices, for example, are used by software, applications, algorithms, as examples, running on and/or executed by controller 116. The storage devices can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random access memories (DRAM), static random access memories (SRAM), and other forms of volatile memories known in the art.

The controller 116 can be configured to communicate with sensors, valves, injectors, and other components of the engine 102 via various wired or wireless communications technologies and components using various public and/or proprietary standards and/or protocols.

The fluid provided in the supply lines 112 can be delivered to respective prechambers (shown in FIG. 2) for each of the cylinders 114. Prechambers can be used by the engine 102 to aid in combustion and improve fuel utilization. When an air-fuel mixture is combusted within the prechamber, temperatures can increase to levels sufficient to produce NOx. The controller 116 can control the fluid injection to deliver the fluid to the prechamber following combustion within the prechamber to limit the increase in temperature, thereby limiting NOx production within the engine.

Figure 2:
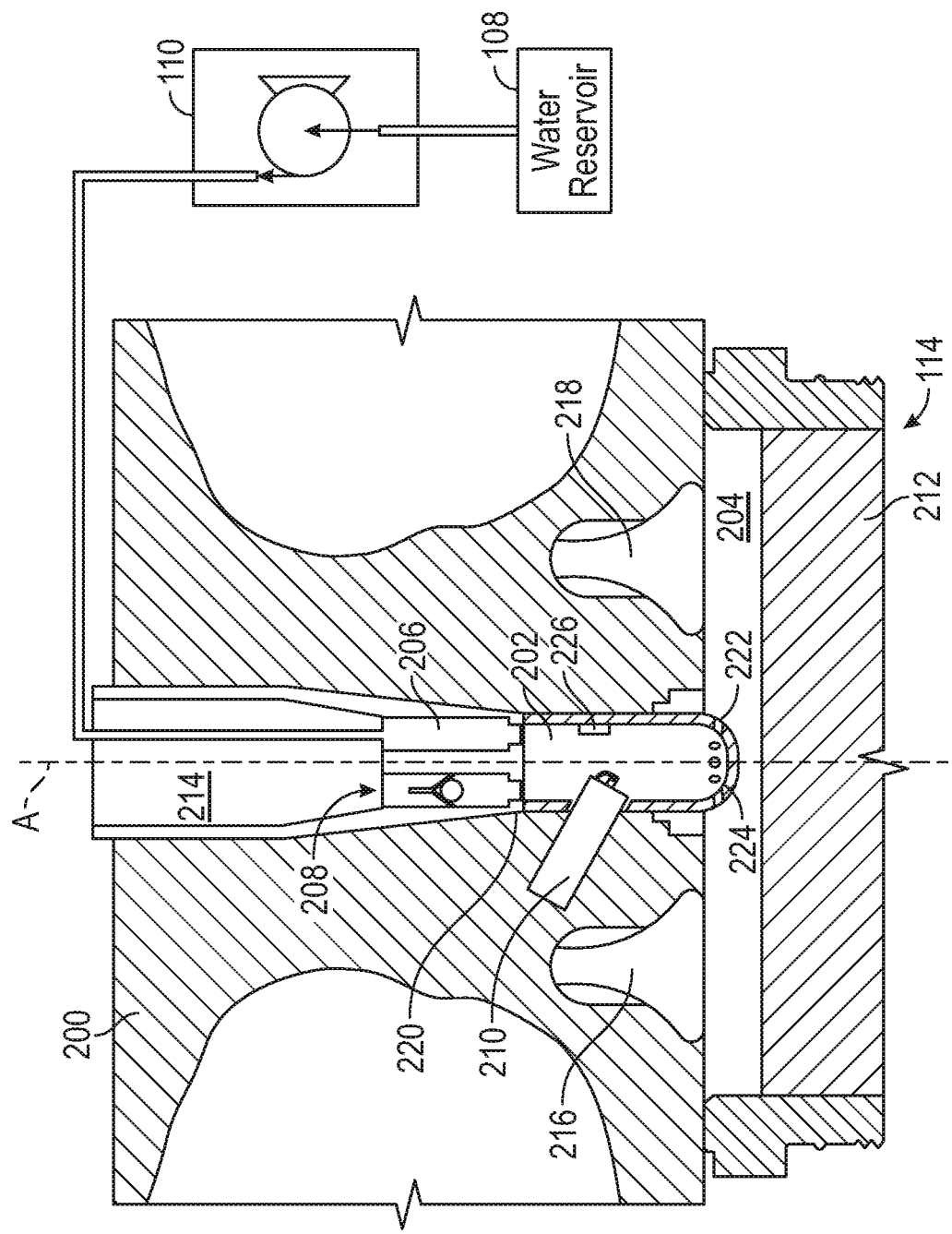
FIG. 2 is a cross-section view of an example cylinder and cylinder head of a gas engine that includes a fluid injector for a prechamber.

FIG. 2 is a cross-section view illustrating a pre-combustion system for a respective cylinder 114 of the engine 102. The pre-combustion system includes a cylinder head 200, a prechamber 202, a main chamber 204, a fluid injector 206, a fuel valve 208, a spark plug 210, a piston 212, a fuel chamber 214, an intake port 216, and an exhaust port 218. The prechamber 202 extends from an end 220 to an end 222, and annularly about an axis A to define a volume within which an air-fuel mixture can be combusted. The prechamber also includes fluid ports 224 configured to fluidly connect the internal volume of the prechamber 202 to the main chamber 204, and a pressure sensor 226 configured to sense a pressure within the prechamber 202. The pressure sensor 226 can be configured to provide the sensed pressure to the controller 116 (FIG. 1), for example.

During operation, the piston 212 is capable of reciprocating in the cylinder 114. Typically, the piston 212 reciprocates from a bottom dead center (BDC) to a top dead center (TDC) in multiple cycles. The volume between the TDC and the BDC defines a swept volume, where the swept volume is indicative of a volume available for a combusted charge to occupy. The phrase charge can be understood either as air or a mixture of air and fuel.

The intake port 216 can be used to introduce the charge into the cylinder 114. Once the charge is combusted in the main combustion chamber 204, the products of the combustion are forced out of the cylinder 114, by the reciprocating movement of the piston 212, with the aid of the exhaust port 218.

In one example, the prechamber 202 can be formed as an inbuilt device with the cylinder head 200. In another example, the prechamber 202 may be a separate device that can be coupled to the cylinder head 100. The prechamber 202, in addition to receiving fuel from the fuel chamber 214, can be configured to receive a charge from the main combustion chamber 204 through the fluid ports 224 during a compression stroke of the piston 212. The fluid ports 224 can be formed in a wall at the end 222 of the prechamber 202, for example.

The charge from the main chamber 204 can be a mixture, for example, that includes higher stoichiometric amount of air compared to stoichiometric amount of fuel. Accordingly, a stoichiometric ratio of lean air-fuel mixture would have a value greater than one. During the compression stroke, the piston 212 moves from the BDC to the TDC. Accordingly, the lean air-fuel mixture drawn into the cylinder 114 in a prior suction stroke is forced into the prechamber 202 through the ports 224 by the piston 212 during the movement from the BDC to the TDC.

To assist combustion in the main chamber 204, a small quantity of fuel in the prechamber 202 can be ignited using the spark plug 210. During the compression stroke, when the charge enters the prechamber 202 from the main chamber 204, pure fuel (or in other examples, a premixed air-fuel mixture) can be provided to the prechamber 202 through the fuel valve 208. In one example, the fuel valve 208 can be configured using a ball valve and plate valve that permit, due to the increased pressure in the prechamber 202, the fuel from the fuel chamber 214 to enter the prechamber 202. In other examples, the fuel valve 208 can be replaced with a fuel injector, for example, controllable to inject pure fuel or an air-fuel mixture into the prechamber 202 at the desired time.

After the fuel from the fuel chamber 214 is delivered to the prechamber 202, and prior to the end of the compression stroke, for example, the spark plug 210 can be controlled to ignite the mixture present within the prechamber 202. As soon as the spark plug 210 fires, the rich air-fuel mixture is combusted in the prechamber 202. The combusted fuel is delivered to the main chamber 204 through the ports 224, which creates combustion of the fuel present in the main chamber 204.

Following the combustion within the prechamber 202, fluid can be provided to the prechamber 202 using the fluid injector 206. The fluid can be water, air, nitrogen, or other liquid or gaseous media used to cool the prechamber 202 following combustion. By cooling the prechamber 202 following combustion, the amount of NOx produced by the prechamber combustion can be reduced or eliminated. The mass of fluid provided to the prechamber 202 only needs to be large enough to provide enough cooling for the prechamber 202 to stunt the formation of NOx. In an illustrative example, the fluid can be water and the mass of water required to provide enough cooling to stunt the formation of NOx is less than 0.1% of the total engine trapped mass.

The fluid injector 206 is controlled to deliver the fluid to the prechamber 202 after combustion has taken place. In one example, to control injection of the fluid, the pressure sensor 226 can be used to detect the combustion within the prechamber 202. The pressure sensor 226 can be any device capable of outputting an analog or digital signal indicative of pressure within the prechamber 202. The sensed value can be provided to controller 116, for example, which can monitor the sensed value to monitor the pressure within the prechamber 202. The controller 116 can detect a pressure spike indicative of combustion within the prechamber 202 and then subsequently control the fluid injector 206 to deliver a small amount of fluid into the prechamber 202 to cool the prechamber. In other examples, the fluid can be delivered to the prechamber 202 based solely on engine timing. For example, the controller 116 can control the fluid injector 206 to deliver the fluid to the prechamber 202 a specified amount of time following the ignition timing for the spark plug 210.

INDUSTRIAL APPLICABILITY

Figure 3:
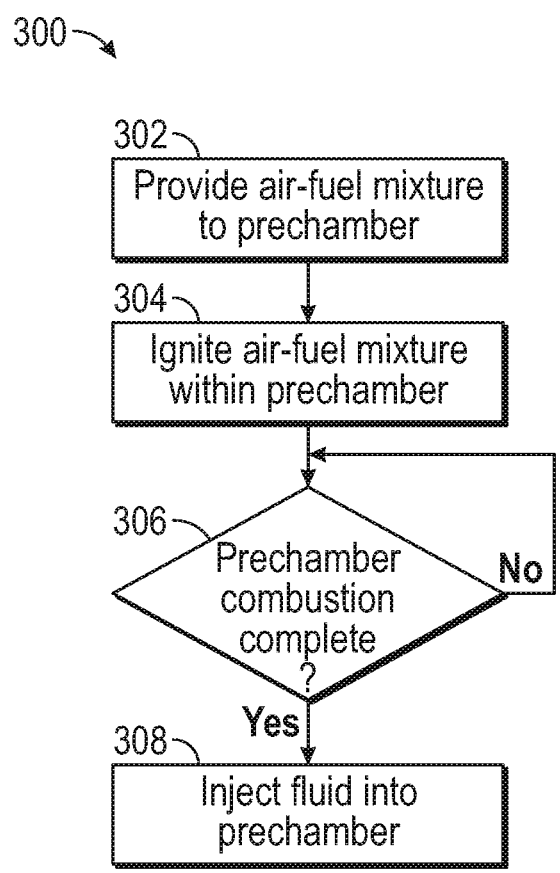
FIG. 3 is a flowchart illustrating a method of injecting a fluid into a prechamber.

In one illustrative example, the engine 102 is a Caterpillar G3606 A4 engine. The gas engine 102 can be fueled using field gas, natural gas, coal bed methane, wellhead gas, propane, or any other suitable gas. The engine includes several cylinders 114 and several respective prechambers 202. FIG. 3 is a flowchart illustrating a method 300 of providing fluid to the respective prechambers of the engine 102 following combustion within the prechamber.

At step 302, a compression stroke of the piston 212 forces a lean air-fuel mixture into the prechamber 202. A fuel valve 208 contemporaneously delivers fuel into the prechamber. At step 304, prior to the end of the compression stroke of the piston 212, the air-fuel mixture within the prechamber 202 is ignited using the spark plug 210. At step 306, the method 300 waits until the combustion event in the prechamber 202 is complete. This can be accomplished using closed-loop control, for example, by monitoring a pressure within the prechamber 202, or can be accomplished using open-loop control, for example, by waiting a specified amount of time following firing of the spark plug 210.

At step 308, a small amount of water or other fluid is injected into the prechamber 202 using the fluid injector 206. This amount can be on the order of 0.1% of the total engine trapped mass. This provides cooling for the prechamber 202 following the combustion event, which limits nitrogen oxide production within the prechamber 202, limiting the overall nitrogen oxide production by the engine 102.

The above detailed description is intended to be illustrative, and not restrictive. The scope of the disclosure should, therefore, be determined with references to the appended claims, along with the full scope of equivalents to which such claims are entitled.

What is claimed is:

1. A combustion system comprising:
   a combustion chamber;
   a prechamber extending from a first end to a second end, the prechamber fluidly connected to the combustion chamber through at least one port positioned at the first end;
   a fluid injector configured to introduce a fluid into the prechamber at the second end following combustion of an air-fuel mixture within the prechamber;
   a pressure sensor positioned within the prechamber and configured to sense a pressure of the prechamber; and
   a controller configured to:
      monitor the sensed pressure from the pressure sensor to detect completion of the combustion of the air-fuel mixture within the prechamber; and
      control the fluid injector to introduce the fluid into the prechamber upon the detected completion of the combustion within the prechamber.

2. The combustion system of claim 1, further comprising:
   a spark plug positioned between the first end and the second end of the prechamber and configured to ignite the air-fuel mixture within the prechamber to initiate the combustion within the prechamber.

3. The combustion system of claim 1, further comprising:
   a fuel valve positioned at the second end of the prechamber and configured to introduce fuel into the prechamber prior to the combustion of the air-fuel mixture within the prechamber.

4. The combustion system of claim 1, wherein the fluid is water and wherein the combustion system further comprises a water reservoir configured to hold the water for the fluid injector.

5. The combustion system of claim 4, further comprising a water pump fluidly connected between the water reservoir and the fluid injector and configured to move the water to the fluid injector from the water reservoir.

6. A gas engine comprising a plurality of cylinders, wherein each of the plurality of cylinders comprises the combustion system of claim 1.

7. The gas engine of claim 6, further comprising:
   a fluid reservoir configured to hold the fluid; and
   a pump configured to move the fluid from the fluid reservoir to each of the plurality of cylinders.

8. A method of operating an engine, the method comprising:
   providing an air-fuel mixture into a prechamber of the engine, wherein the prechamber extends from a first end to a second end;
   igniting the air-fuel mixture within the prechamber;
   transferring the ignited air-fuel mixture to a main chamber through at least one port located at the first end of the prechamber, wherein the main chamber is in fluid communication with the prechamber through the at least one port; and
   delivering, by a fluid injector positioned at the second end of the prechamber, a fluid into the prechamber following combustion of the air-fuel mixture in the prechamber and prior to providing a subsequent air-fuel mixture to the prechamber of the engine.

9. The method of claim 8, wherein igniting the air-fuel mixture within the prechamber comprises igniting the air-fuel mixture within the prechamber using a spark plug positioned between the first end and the second end of the prechamber.

10. The method of claim 8, wherein delivering, by the fluid injector positioned at the second end of the prechamber, the fluid into the prechamber following the combustion of the air-fuel mixture in the prechamber comprises: pumping the fluid from a fluid reservoir to the fluid injector; and controlling the injector to deliver the fluid into the prechamber following the combustion of the air-fuel mixture within the prechamber.

11. The method of claim 10, wherein controlling the injector to deliver the fluid into the prechamber following combustion of the air-fuel mixture within the prechamber comprises:
   monitoring a pressure within the prechamber;
   detecting, based on the monitored pressure, when combustion of the air-fuel mixture within the prechamber is complete; and
   injecting the fluid into the prechamber following the detection of the completion of the combustion within the prechamber.

12. The method of claim 8, wherein delivering, by the fluid injector positioned at the second end of the prechamber, the fluid into the prechamber following the combustion of the air-fuel mixture in the prechamber comprises injecting water into the prechamber following the combustion of the air-fuel mixture in the prechamber.

13. The method of claim 12, wherein injecting the water into the prechamber following the combustion of the air-fuel mixture in the prechamber comprises delivering an amount of water less than or equal to 0.1% of a total trapped mass of the engine into the prechamber.

14. An engine comprising:
   a cylinder comprising a piston and a main chamber;
   a cylinder head;
   a prechamber disposed within the cylinder head and extending from a first end to a second end, wherein the prechamber is fluidly connected to the main chamber through at least one port positioned in the first end;
   a fluid injector positioned at the second end and configured to deliver a fluid into the prechamber, wherein the fluid is water;
   a fluid reservoir configured to hold the fluid for the fluid injector; and a controller configured to:
  control the fluid injector to deliver the water into the prechamber such that a mass of the water is less than 0.1% of a total engine trapped mass.
15. The engine of claim 14, further comprising:
a spark plug that extends into the prechamber and is configured to ignite an air-fuel mixture within the prechamber.
16. The engine of claim 15, wherein the fluid injector is configured to deliver the fluid into the prechamber following combustion of the air-fuel mixture within the prechamber.
17. The engine of claim 14, further comprising:
a fluid pump configured to deliver the fluid from the fluid reservoir to the fluid injector.
18. The engine of claim 14, wherein the engine is a gas engine configured to drive a gas compressor.

* * * * *